US011264730B2

(12) United States Patent
Thompson, Jr. et al.

(10) Patent No.: US 11,264,730 B2
(45) Date of Patent: Mar. 1, 2022

(54) QUAD-PORT RADIATING ELEMENT (71) Applicant: Amphenol Antenna Solutions, Inc., Rockford, IL (US)

(72) Inventors: James E. Thompson, Jr., Mooresville, NC (US); Mark W. Kishler, Lenoir, NC (US); Jodie M. Bell, Tallahasse, FL (US); Joshua W. Shehan, Melbourne, FL (US); Kostyantyn Semonov, Denver, NC (US); Ryan M. Nagel, Hickory, NC (US); James C. Carson, Newton, NC (US)

(73) Assignee: Amphenol Antenna Solutions, Inc., Rockford, IL (US)

( * ) Notice: Subject to any disclaimer, the term of this patent is extended or adjusted under 35 U.S.C. 154(b) by 244 days.

(21) Appl. No.: 16/452,133

(22) Filed: Jun. 25, 2019

(65) Prior Publication Data
US 2020/0006862 A1 Jan. 2, 2020

Related U.S. Application Data (60) Provisional application No. 62/690,570, filed on Jun. 27, 2018.

(51) Int. Cl.
*H01Q 21/06* (2006.01)
*H01Q 21/00* (2006.01)
*H01Q 9/30* (2006.01)
*H04B 7/0413* (2017.01)

(52) U.S. Cl.
CPC ............ *H01Q 21/061* (2013.01); *H01Q 9/30* (2013.01); *H01Q 21/0006* (2013.01); *H01Q 21/0031* (2013.01); *H04B 7/0413* (2013.01)

(58) Field of Classification Search
CPC .................. H01Q 21/26; H01Q 9/40
See application file for complete search history.

(56) References Cited

U.S. PATENT DOCUMENTS

| 4,730,195 A * | 3/1988 | Phillips ................... H01Q 9/18 343/727 |
| 2003/0030591 A1* | 2/2003 | Gipson .................... H01Q 9/30 343/792 |
| 2004/0160380 A1* | 8/2004 | Simpson ................ H01Q 1/242 343/850 |

(Continued)

FOREIGN PATENT DOCUMENTS

CN 105789888 A 7/2016

OTHER PUBLICATIONS

International Search Report Issued in PCT/US2019/039012 dated Nov. 5, 2019.

(Continued)

*Primary Examiner* — Ricardo I Magallanes
(74) *Attorney, Agent, or Firm* — Blank Rome LLP (57) ABSTRACT

An Antenna Radiating Element provides 4 simultaneous isolated radiation ports that can be used to increase the orders of MIMO communication for wireless applications. An antenna array that contains a plurality of the Quad-Port Radiating Elements (QPRE). An antenna that contains multiple arrays of the QPRE in single-band or Multi-Band configurations that produces 2× the available polarization states without the need to increase the antenna aperture or reduce the size of the antenna array.

7 Claims, 12 Drawing Sheets

(56) References Cited

U.S. PATENT DOCUMENTS

| | | | |
|---|---|---|---|
| 2007/0247382 A1* | 10/2007 | Wan | H01Q 9/40 |
| | | | 343/725 |
| 2012/0242558 A1 | 9/2012 | Song et al. | |
| 2013/0002505 A1 | 1/2013 | Teillet et al. | |
| 2017/0244156 A1 | 8/2017 | Montgomery et al. | |
| 2018/0138597 A1 | 5/2018 | Shehan | |
| 2018/0183134 A1* | 6/2018 | Jan | H01Q 3/24 |

OTHER PUBLICATIONS

J. Thaysen, et al., "Envelope Correlation in (N, N) MIMO Antenna Array from Scattering Parameters", Microwave and Optical Technology Letters, vol. 48, No. 5, May 2006, pp. 832-834.

* cited by examiner

FIG. 2C
SIMULATED ECC

FIG. 2C
MEASURED ECC

QUAD-PORT RADIATING ELEMENT

RELATED APPLICATION

This application claims the benefit of U.S. Provisional Application No. 62/690,570, filed Jun. 27, 2018, the entire contents of which are incorporated herein by reference.

BACKGROUND OF THE INVENTION

Field of the Invention

The present invention relates to quad-port radiating elements. More particularly, the present invention relates to double port capacity antenna elements and arrays.

Background of the Invention

Diversity techniques in the wireless communication are used to improve signal and system performance. Maximum diversity is achieved when the envelope correlation coefficient (ECC) is equal to zero. Polarization diversity, using dual-polarized element arrays, is the example transmit and receive diversity scheme in the wireless communication industry. Polarization diversity techniques provide a greater immunity over spatial diversity when the receive power is cross-polarized to the spatial diversity antenna's polarization since a dual-polarized element has two orthogonal simultaneous polarization states. Dual-polarized radiating elements provide a compact antenna structure without the space requirements of spatial diversity techniques.

Growing demand for higher data rate usage in the wireless industry and future 5G requirements place a higher demand on available frequency spectrum and efficiency of channel allocations. Current methods to improve data rates are accomplished through increased orders of Multiple-Input Multiple-Output (MIMO) which include the addition of new macro-Cell, Small-Cell and micro-Cell installations. The addition of new installations or additions to existing installations is the increase in Capex, Opex, leasing cost, wind-load, etc.

An alternate solution requires the Antenna be divided in half to provide twice the number of ports per band to increase the MIMO for a 2×2 to 4×4 capability. This method has the undesirable effect of reducing the directivity, gain and pattern control usually afforded in the full size antenna. Other methods such as active antennas and Massive MIMO antennas are being deployed to address the demand for higher data rates.

Figure 3:
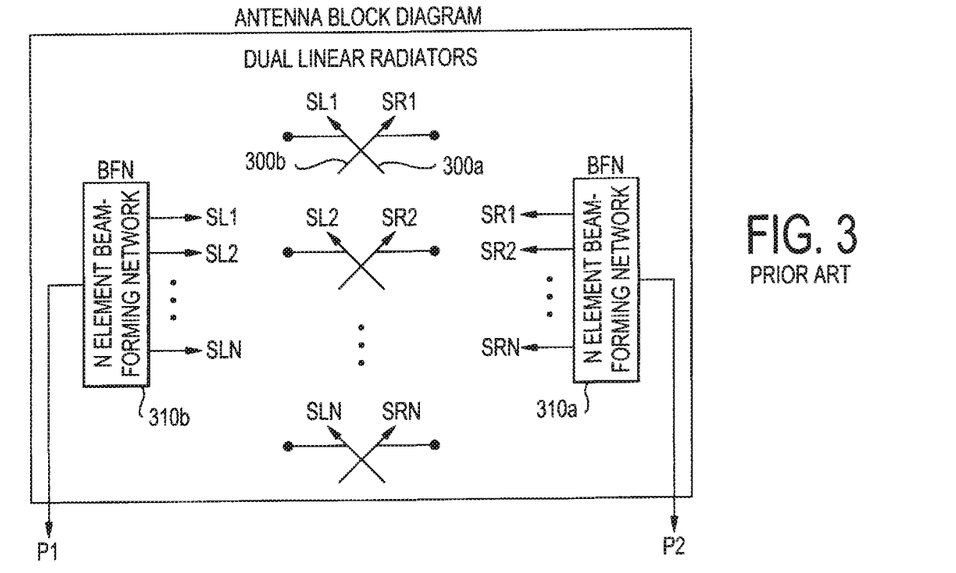
FIG. 3 is a block diagram illustrating the primary components of current state of the art dual linear polarized antenna arrays.

Referring to FIG. 3, a block diagram is shown of the typical state of the art, dual linear polarized array. The radiating elements 300a, 300b are shown as slant polarizations but can be configured easily by those skilled in the art to create H/V polarization or CP polarized radiation. The exact type of radiating element used can vary, commonly used element types are dipoles and patches. A plurality of radiating elements are used in combination to create an antenna array to provide desired pattern coverage and gain, so a N element array is depicted where N can be and positive integer number. The N elements array is connected to Beam-Forming Networks 310a, 310b (BFN) to provide to provide elevation pattern control. To those skilled in the art, there exist numerous BFN topologies that provide fixed electrical tilt or variable electrical tilt capability with various degrees of freedom to shape the elevation pattern as desired.

Figure 5:
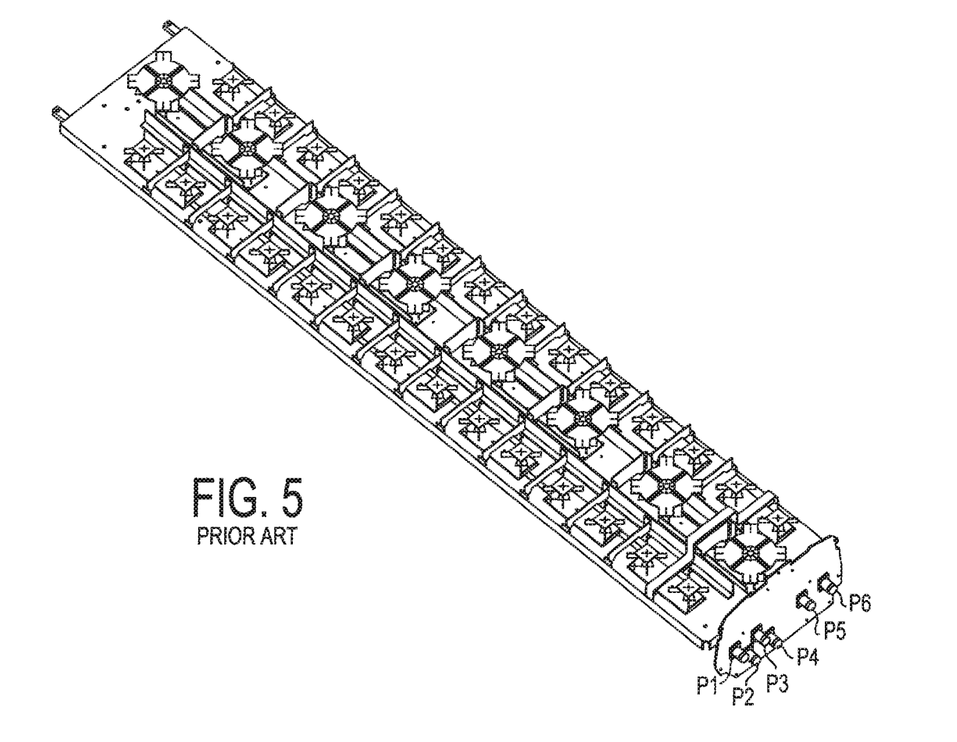
FIG. 5 is an isometric illustration of the current state of the art Tri-band dual linear polarized antenna array providing 6 ports for wireless communications.

The antenna of FIG. 5 is shown to include the primary components associated with conventional wireless communication spectrum. The antenna consist of 6 ports, 2 ports for Low Band and 4 ports for High Band, thus providing 2×2 MIMO for Low Band and 4×4 MIMO for High Band wireless coverage.

SUMMARY OF THE INVENTION

The present invention addresses the need for growth in data rates while maintaining the desired directivity, gain and pattern control in a single unit without increasing the Antenna size. Through the use of Quad-Port Radiating Element (QPRE) and Beam-Forming Network (BFN) arrays, the resulting Antenna maintains all performance parameters that have been optimized to provide ideal coverage for a given installation and allow the increase in MIMO with the necessary performance to achieve full data rate through-puts that the industry needs to meet the growing capacity demands in the future.

This invention also has application for band optimization applications. Today's broadband radiating elements allow multiple wireless bands to be carried on the same array. The advantage to this is that the different bands can occupy the same structure and save on tower space but the inherent disadvantage is that due to the array configuration and different frequency of operation for the technologies is that the vertical coverage cannot be optimized for each band without the use of costly diplexers to allow for independent tilt for each wireless band. This invention allows the arrays to produce the ideal tilt while consuming the same array space and thus providing a superior coverage optimization.

Through this invention, the size of the basic element of an antenna system, the radiating element, the port count is doubled while maintaining existing performance by providing sufficiently isolated elements between all four ports and radiation pattern parameters: VSWR, isolation, pattern shape, co- and cross-pol performance, array factor, Low Envelope correlation coefficient. Typical radiating elements with two-polarization states consume approximately $\lambda/2$ spacing at $f_c$; this radiating element operates utilizing approximately $\lambda/4$ at $f_c$ with additional ports consuming a separate approximately $\lambda/4$ position resulting in twice the number of ports for the same volume of space. The element is impedance matched to a reference system impedance $Z_0$. The reference impedance for this particular application is $Z_0$=50 ohms but can be set to any value as desired.

The present invention provides an antenna having a planar array of four simultaneous polarization states. Each QPRE radiating element can be implement as a crossed element structure with a first radiating element $SR_a$ and a second radiating element $SL_a$ are orthogonal to each other and a third radiating element $SR_b$ and fourth radiating element ($SL_b$) are orthogonal to each other. First radiating element $SR_a$ and third radiating element $SR_b$ are collinear and second radiating element $SL_a$ and fourth radiating element $SL_b$ are collinear with respect to each other. The critical performance parameters in this invention are the isolation that is achieved between first and third radiating elements and second and fourth radiating elements that provide low ECC below 0.1.

Beam-Forming Networks (BFN), can be implemented through various feed distribution networks types such as fixed electrical tilt, phase adjustable or individual element feeds, are connected to each of the four radiating elements of the QPRE to provide a QPRE array antenna. Since the QPRE elements are impedance matched to a system impedance of $Z_0$ the feed network are arbitrary to the invention. A ground plane is positioned generally parallel to and spaced apart from the radiating elements by a predetermined distance.

DETAILED DESCRIPTION

In describing the embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes; it being understood that the invention may be embodied in other forms not specifically shown in the drawings.

The Radiating element of the present invention is useful for wireless communications. The QPRE element uses isolated polarization states to provide diversity through low envelope correlation coefficient (ECC). The ECC calculation can be according to Thaysen and Jacobsen on '*Envelope Correlation In (N,N) MIMO Antenna Array From Scattering Parameters*'. Diversity techniques and MIMO systems of various degrees of elements are dependent on the envelope correlation coefficient (ECC). Meaning that an ECC<0.1 will produce greater data throughput than an ECC value of <0.5. The ECC $\rho_e$ can be calculated for a two antenna system can be calculated from $$\rho_e = \frac{\left|\int\int_{4\pi}[\vec{F}_1(\theta,\phi)\cdot\vec{F}_2^*(\theta,\phi)]d\Omega\right|^2}{\int\int_{4\pi}|\vec{F}_1(\theta,\phi)|^2 d\Omega \int\int_{4\pi}|\vec{F}_2(\theta,\phi)|^2 d\Omega}.$$

Where $\vec{F}_i(\theta,\phi)$ is the field radiation pattern of the antenna system when port i is excited, all other ports are terminated in $Z_0$ match, and • is the Hermitian product. The relationship between the scattering parameters and the element radiation pattern is given by $$I - \vec{S}^H \vec{S} = \vec{F}^H \vec{F},$$

Where I is the identity matrix and H is the complex conjugate transpose. Using the law of conservation of energy.

The correlation between antennas i and j in a MIMO system consisting of N antennas is then given by $$\rho_e(i, j, N) = \frac{|C_{i,j}(N)|^2}{\prod_{k=i,j}[1 - C_{k,k}(N)]},$$

where $C_{i,j}(N)$ is given by $$C_{i,j}(N) = \sum_{n=1}^{N} S_{i,n}^* S_{n,j}.$$

By substitution, the envelope correct $\rho_e$ expressed in scattering parameters for N elements can be calculated as follows:

$$\rho_e(i, j, N) = \frac{\left|\sum_{n=1}^{N} S_{i,n}^* S_{n,j}\right|^2}{\prod_{k=i,j}\left[1 - \sum_{n=1}^{N} S_{k,n}^* S_{n,k}\right]}.$$

For the minimum impact to potential throughput the ECC=zero. In practice ECC<0.1 provides superior throughput and is achieved through the present invention.

Figure 1A:
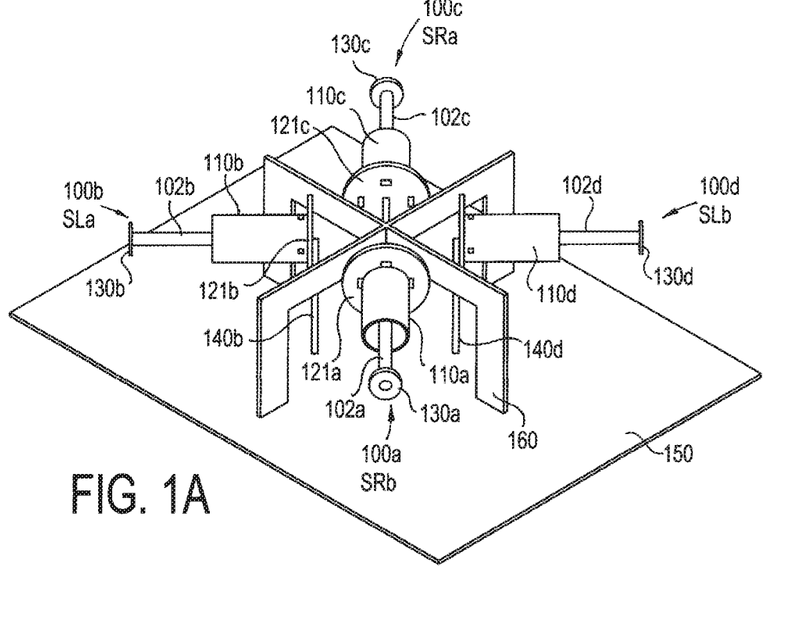
FIG. 1A is an illustration of a single Quad-Port Radiating Element (QPRE) for an exemplary embodiment of the present invention, isometric view.

Turning to FIG. 1A, the QPRE Radiating Element covering a wireless frequency band of 698-960 MHz. The QPRE has four sleeve monopole elements providing four simultaneous polarization states. The co-located dual linear polarized radiating elements consume an area of ~0.5*λ at $F_c$, where $F_c$ is the center frequency of the operating frequency band. The QPRE consumes ~0.5*λ at $F_L$, where $F_L$ is the low frequency of the operating frequency band put will produce 2 additional polarization ports for wireless communication.

Figure 1B:
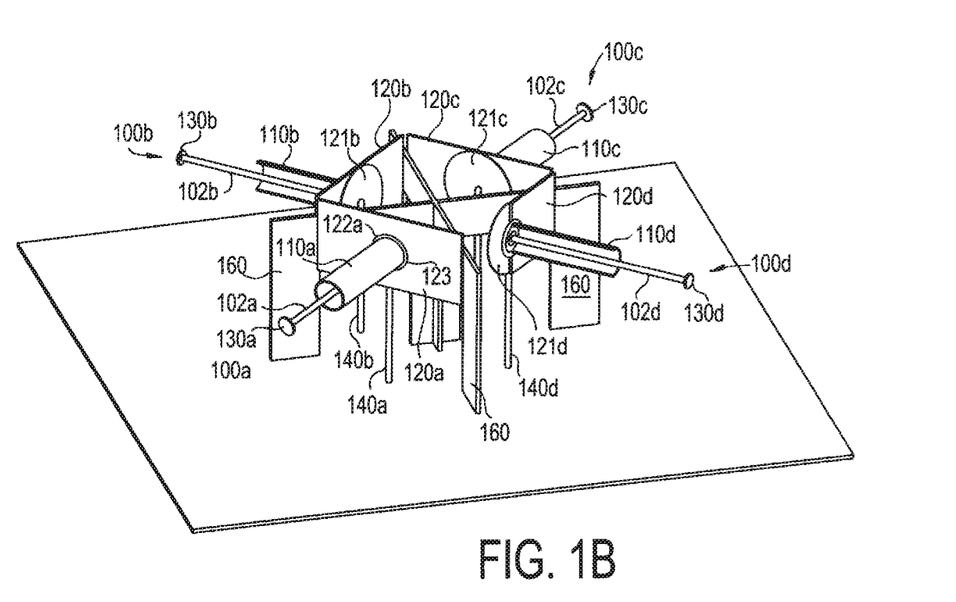
FIG. 1B is an illustration of the QPRE isometric view of FIG. 1A rotated 90° clockwise with a cut-away cross-sectional view of the sleeve monopole, for 'b' and 'd' QPRE elements.

As further illustrated in FIGS. 1A-1B, the QPRE is shown where the antenna has radiating elements or sleeve monopoles 100a-100d, an isolation grid 160, a grounded reflector 150, and a conductor wire or feed cable 140a-140d. The sleeve monopole 100a primarily comprises a main radiator 102a, a sleeve 110a. The antenna also has an RF feed PCB 120a and a short circuit for the sleeve 110a. In this embodiment, the main radiator 100a also includes a disk load 130a that reduces the length of main radiator 100a to ~0.25λ at the lower end of the operating band. The disk load 130a can be a disk that is comprised of PCB material where only a single side (bottom side, i.e., the side facing inward toward the radiator 100a) is covered with copper. The copper is soldered to the main radiator 100a for direct electrical contact. The sleeve 110a, and the main radiator 100a are composed of material with high electrical conductivity such as copper or brass.

The isolation grid 160 is a single integral piece that is formed by first and second isolation members. Each of the isolation members have two legs that extend substantially orthogonally to the grounded reflector 150, and a cross-member that extends between the legs and connects the legs. The isolation members meet at about the middle of each cross-member substantially orthogonally to each other to form an X-shape. Thus, the isolation members form four quadrants or elements, an upper slant left quadrants $SL_a$ combined with radiator 100b, a lower slant left quadrants $SL_b$ combined with radiator 100d, an upper slant right quadrants $SR_a$, combined with radiator 100c, and a lower slant right quadrants $SR_b$. combined with radiator 100a. The isolation members can intersect each other and can abut one another or can be separated by a small gap or space so that the various segments $SL_a$, $SL_b$, $SR_a$, $SR_b$ are discrete elements that do not touch. The upper and lower slant left elements $SL_a$, $SL_b$ are linearly arranged with each other, and the upper and lower slant right elements $SR_a$, $SR_b$ are linearly arranged with each other. And the slant left elements $SL_a$, $SL_b$ are substantially orthogonal to the slant right elements $SR_a$, $SR_b$. The sleeve monopoles 100 are the radiating elements and the grid 160 are coupling elements.

In one embodiment, one cross-member extends substantially parallel to the longer side of the reflector 150, and the other cross-member extends substantially parallel to the shorter side of the reflector 150. The legs and cross-members are thin and elongated flat planar plates, with the first isolation member being in a first isolation member plane and the second isolation member being in a second isolation member plane, with the first isolation plane being substantially orthogonal to the second isolation plane. The plates are flat and have a first planar surface and a second facing planar surface that are on opposite sides and that extend substantially orthogonal to the top planar surface of the reflector 150.

The RF feed PCB 120a is fabricated as a printed circuit board (PCB) where the RF feed bottom copper layer 121a is coupled to the sleeve 110a to produce a RF short at the reference plane consisting of the junction between the main radiator 100a, sleeve 110a and coax-cable 140a. The outer conductor of the coax-cable 140a is soldered to the bottom 121a to create a shorting circuit for grounding of the feed port. The coax-cable 140a is Z0=50 ohms in this embodiment. The remainder of the QPRE polarization states and connected in the same fashion for 100b . . . 140b, 100c . . . 140c and 100a . . . 140d. It is noted that the RF feed 120d is partially removed and the sleeves 110b, 110d are shown in cross-section, to better illustrate the invention. However, the RF feed 120d and sleeves 110b, 110d are the same as RF feeds 120a, b, c, and sleeves 110a, c.

Figure 8A:
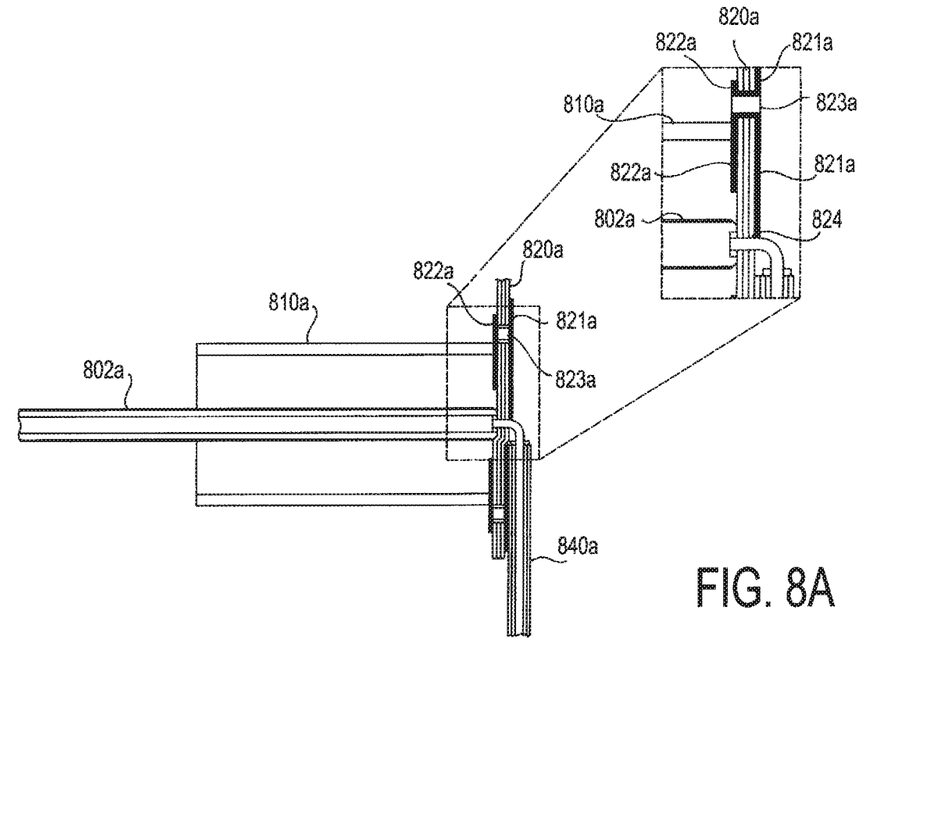
FIG. 8A-8B is sleeve monopole radiating element.

In one embodiment, as shown in FIGS. 1B and 8A, the bottom (our inwardly facing surface) 121 of the RF feeds 120 can have the shape of a disk 121, 821, and the top (or outward-facing surface) of the feed 120 can have an annular ring 122, 822. The RF feeds 120, 820 can be thin elongated rectangular insulative plates that are arranged about the isolation grid 160 in the shape of a square, with the cross-members extending outward beyond the square at the corners of the square and with the legs being outside of the square shape. Accordingly, the cross-members extend through gaps between the RF feeds 120 at the corners of the square shape. The RF feed 120 can be coupled to respective ones of the first and second planar surfaces of the cross-members. For example, the edges of the RF feeds 120 can be soldered to the planar surfaces of the cross-members. However, the RF feed 120 need not be coupled to the grid 160, and can have a separate support. The RF feed 120 plates are each in a respective plane that is substantially orthogonal to the top surface of the planar reflector 150. The plates have an outwardly facing planar side and an inwardly facing planar side.

The sleeve monopole 100, 800 has a main radiator 102, 802 and a sleeve 110, 810. The main radiator 102, 802 can be a solid rod or a hollow tube. The sleeve 110, 810 is a hollow tube with a central bore. The main radiator 102, 802 is received in the bore, such that the sleeve 110, 810 extends concentrically and completely about the main radiator 102, 802 for a least a portion of the length of the main radiator 102, 802. In one embodiment, the RF feed 120, 820 can have an opening 824, as best shown in FIG. 8A. The cable 140, 840 has a center conductor surrounded by an insulative jacket. The main radiator 102, 802 has one end that is coupled (e.g., by solder) to the center conductor of the coaxial cable 140, 840. For example, the center conductor can extend from the inward side of the RF feed 120, 820, through the opening 824 in the RF feed 120, 820 to connect with the main radiator 102, 802 at the inward side of the RF feed 120, 820. The main radiator 102, 802 can be coupled to the RF feed 120, 820, e.g., the coaxial cable 140, 840 can be attached to the back of the disk 121, 821.

The sleeve 110, 810 has a proximal end that couples with the top surface of the ring 122, 822, which for example can face and couple to (e.g., by solder) the outwardly-facing surface at the outwardly-facing side of the feed 120, 820. The main radiator 102, 802 and sleeve 110, 810 extend substantially perpendicularly outward from the outward-facing surface at the outwardly facing side of the feed 120, 820. The sleeve 110, 810 is shorter than the main radiator 102, 8802, so that the main radiator 102, 802 extends further than the sleeve 110, 810.

Figure 8B:
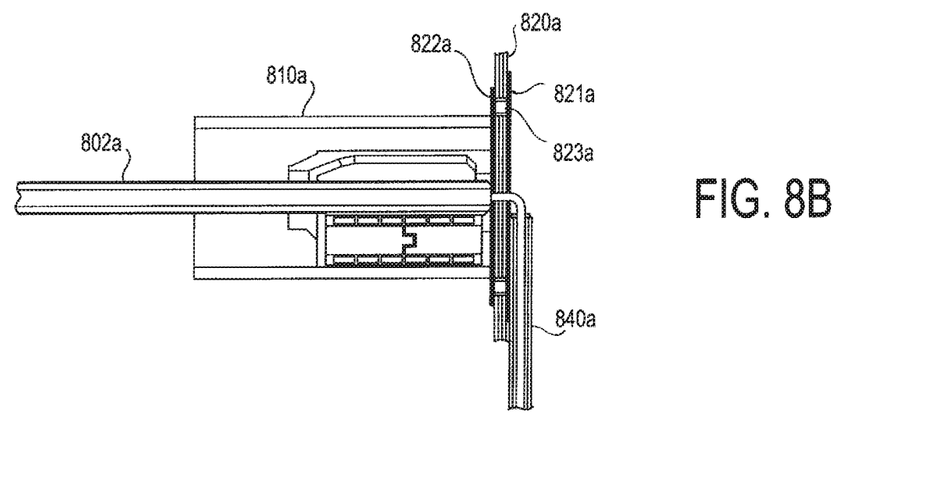
Figure 9A:
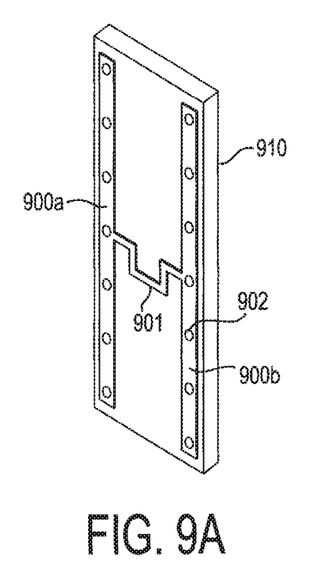
FIG. 9A-9D is a sleeve monopole radiating element having a filter element.
Figure 9B:
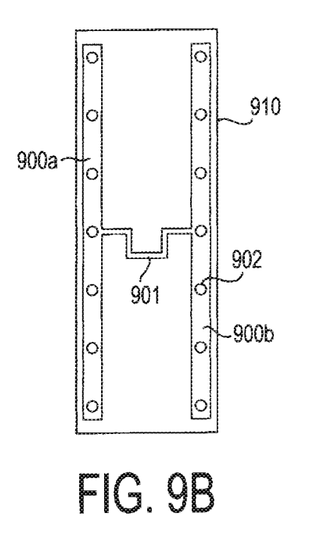
Figure 9C:
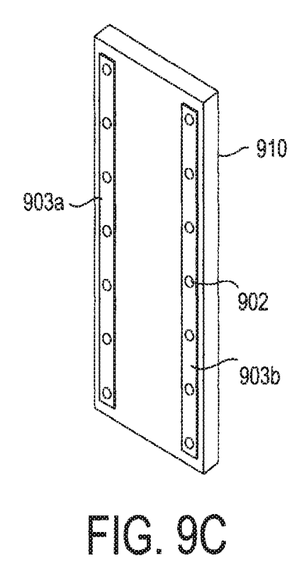
Figure 9D:
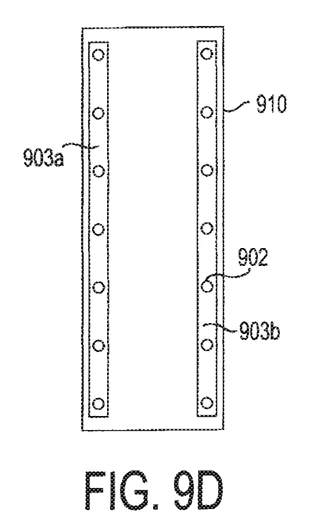

The RF feed 120a, 820 can be a flat insulative substrate such as a PCB and provides a connection between the sleeve 110a, 810 and the disk 121a, 821 to form a short circuit. The outer diameter of the bottom copper disk 121a, 821 is 51 mm±15%, An annular ring 122a, 822 is positioned at the top side of the RF feed PCB 120a, 820, and for example can be etched from the feed 120, 820. The annular ring 122, 822 has an outside diameter (OD) of 24 mm and an inner diameter of (ID) of 18 mm. As best shown in FIGS. 8A, 8B, the annular ring 122a, 822a can be flat, like a washer, and has a central opening.

The sleeve 110, 810 is soldered to the annular ring 122a, 822 so that the sleeve 110a, 810 is in direct electrical contact with the ground side of the RF feed PCB 120a, 820. The radiator 100a, 800 and sleeve 110a, 810 are all elongated members, each having a respective longitudinal axis, and all of which are substantially parallel to each other and perpendicular to the plane of the reflector 150. The reflector 150 in the illustrated, non-limiting embodiment is composed of aluminum sheet metal. The remainder of the QPRE polarization states and connected in the same fashion for 100b . . . 140b, 100c . . . 140c and 100a . . . 140d.

Thus, the ring 122 forms an outer conductive portion is at the outer side of the feed 120, 820, and the disk 121, 821 forms an inner conductive portion at the inner side of the feed 120, 820. A through-hole 123, 823 extends through the feed 120, 820, and can also extend through the ring 122, 822 and disk 121, 821. The through-hole is plated, to electrically connect the ring 122, 822 with the disk 121, 821. The disk 121, 821 is grounded, which in turn grounds the ring 122, 822 and the sleeve 110, 810. However, the main radiator 102, 802 is physically and electrically separated from the sleeve 110, 810 and the ring 122, 822 (within the central opening of the ring 122, 822), so that the main radiator 102, 802 is not grounded.

In one embodiment, the main radiator 102a is a tube that is 112 mm±15%, ~$\lambda$/4 at $F_L$, in length with an outer diameter of 4 mm. The sleeve 110a is a tube with a central opening that receives the main radiator 100a such that the sleeve 110a is concentrically arranged about the main radiator 100a. The inner diameter D of the sleeve 110a is 21 mm and is substantially larger than the outer diameter d of the main radiator 100a, to provide a gap or space between the sleeve 110a and the radiator 100a. The ratio $$\frac{D}{d}$$

can range from values of 3 to 7 and be optimized to provide impedance matching with negligible impact to radiation patterns.

As shown, the bottommost end of the radiator 100a and the sleeve 110a are substantially flush with one another and attach to the RF feed PCB 120a. The radiator 100a is substantially longer in length than the sleeve 110a, so that only a portion of the radiator 100a is surrounded by the sleeve 110a, and the radiator 100a projects outward from the sleeve 110a. The sleeve 110a is used to impedance match the radiator 100a over a larger frequency range i.e. >50% impedance bandwidth. The radiator is at least partly exposed to be able to communicate. In one embodiment of the present invention the length of sleeve 110a is 66 mm±1%, ~0.15*$\lambda F_L$.

The disk load 130a is made of PCB material where the bottom copper has a diameter of 8 mm. The disk 130 is at the distal end of the main radiator 100 and orthogonal to the longitudinal axis of the main radiator 100. The feed cable 140a is also fixed at a 90° angle relative to the longitudinal axis of the main radiator 100a. In the embodiment shown, the disk load 130a has a disk shape that is substantially flat and circular and is located at the topmost end of the radiator 100a. The disk size can be used to optimize the impedance bandwidth of the main radiator. The remainder of the QPRE polarization states and connected in the same fashion for 100b . . . 140b, 100c . . . 140c and 100a . . . 140d.

The isolation grid 160 improves isolation between the four ports of the QPRE. As shown in FIG. 1A-1B, the required dimensions for the isolation walls provide sufficient isolation resulting in low ECC are given by $S_{ij}$>20 dB. In one embodiment, the cross shaped resonant structure has a RF short in the central (common) location of the QPRE that has a vertical extent of ~$\lambda$/4 at $F_L$ connected to a horizontal $\lambda$/4 connected to a vertical capacitive stub the is <$\lambda$/4 providing the required isolation values for the four QPRE ports. The isolation grid 160 provides out of phase coupling between the four-ports to such a degree to cancel the intrinsic coupling in the QPRE element structure.

Adjustment of the isolation grid height, width and gap allow for varying degrees of coupling and impedance. Increase in the height of the grid components lowers the coupling at higher frequencies while increasing the coupling in the lower frequency of operation. Increasing the width with generate greater coupling values across the frequency range. Adjustment of the gap reduces the reactance at the open end of the isolation grid adjusting the impedance of the grid and changes the effective bandwidth of the system. The isolation grid and sleeve monopole work in tandem to provide impedance matching over the desired operating frequency range.

Thus, the four sleeve monopole antennas 100 extend outward from the outward facing surface of the respective fed 120, and are spaced about 90 degrees apart. Each of the first, second, third and fourth antenna 100a, b, c, d has a respective first, second, third, and fourth longitudinal axis that extends along the length of the main radiator 102a, b, c, d. The first longitudinal axis is substantially linear with the third longitudinal axis, and the second longitudinal axis is substantially linear with the fourth longitudinal axis. The first and third longitudinal axis are substantially orthogonal with the second and fourth longitudinal axis.

Figure 2A:
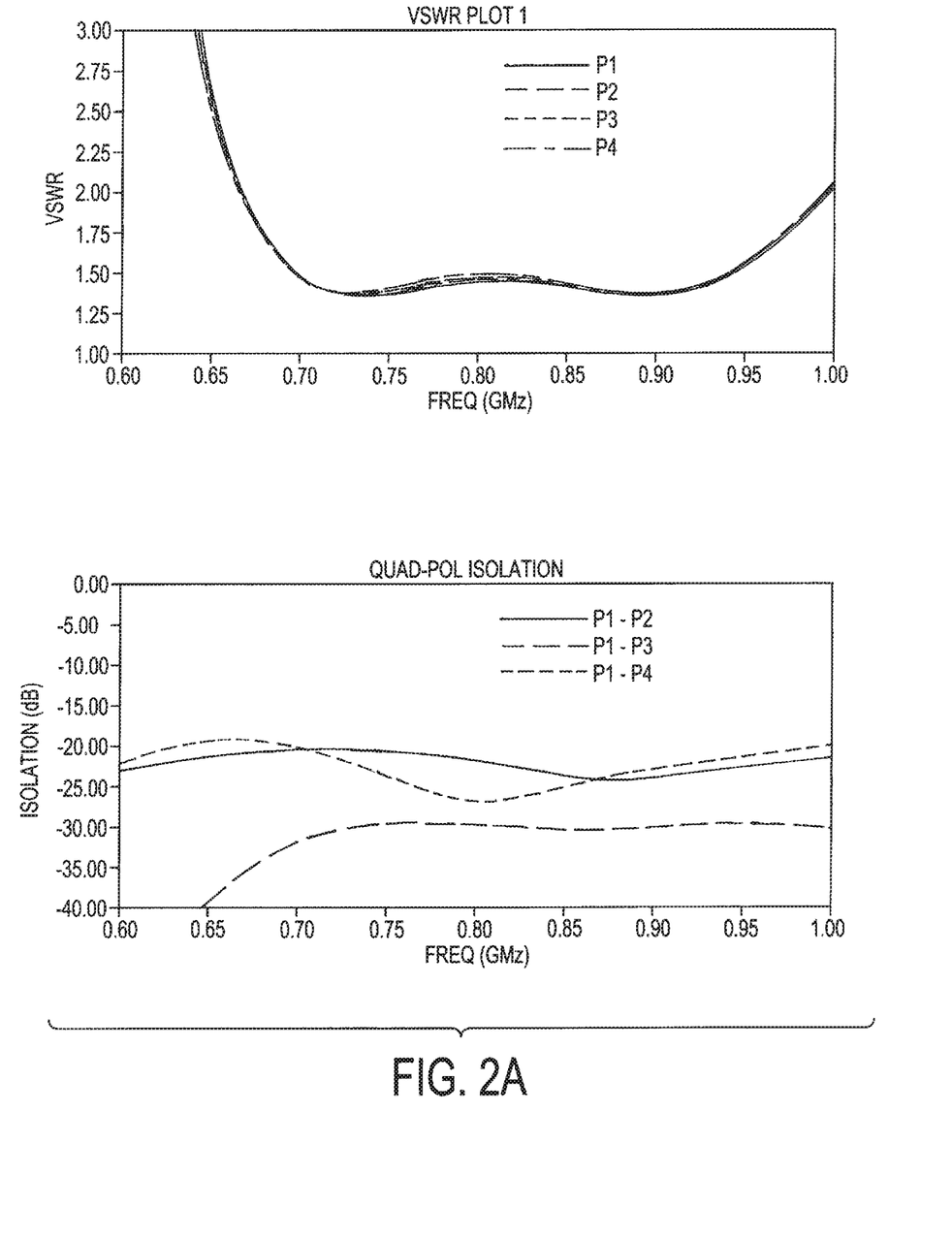
FIG. 2A is simulated VSWR and isolation of the four ports of the QPRE Element operating over the 698-960 MHz frequency range.
Figure 2B:
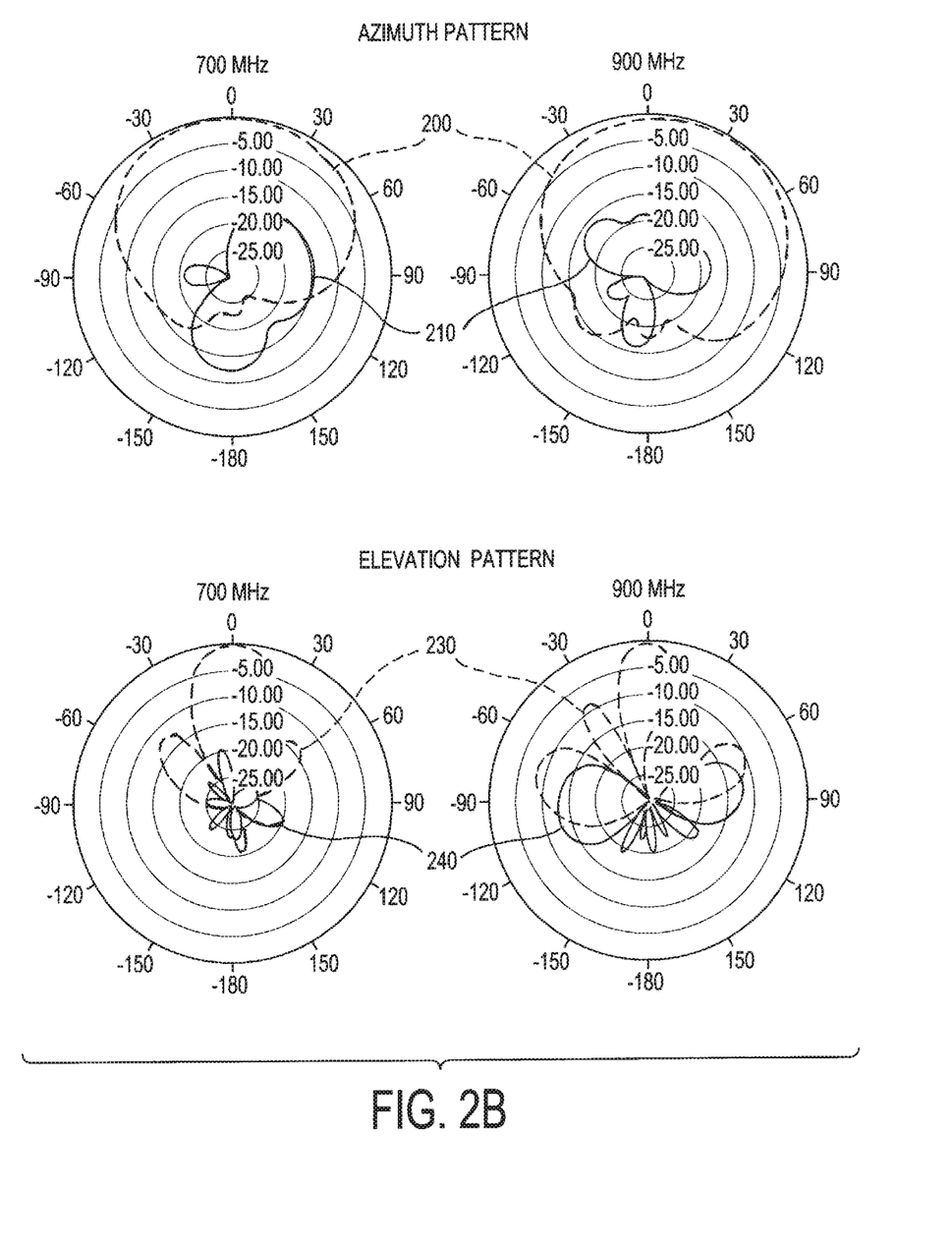
FIG. 2B is simulated azimuth and elevation patterns of the four-element array of the QPRE Element operating over the 698-960 MHz frequency range.
Figure 2C:
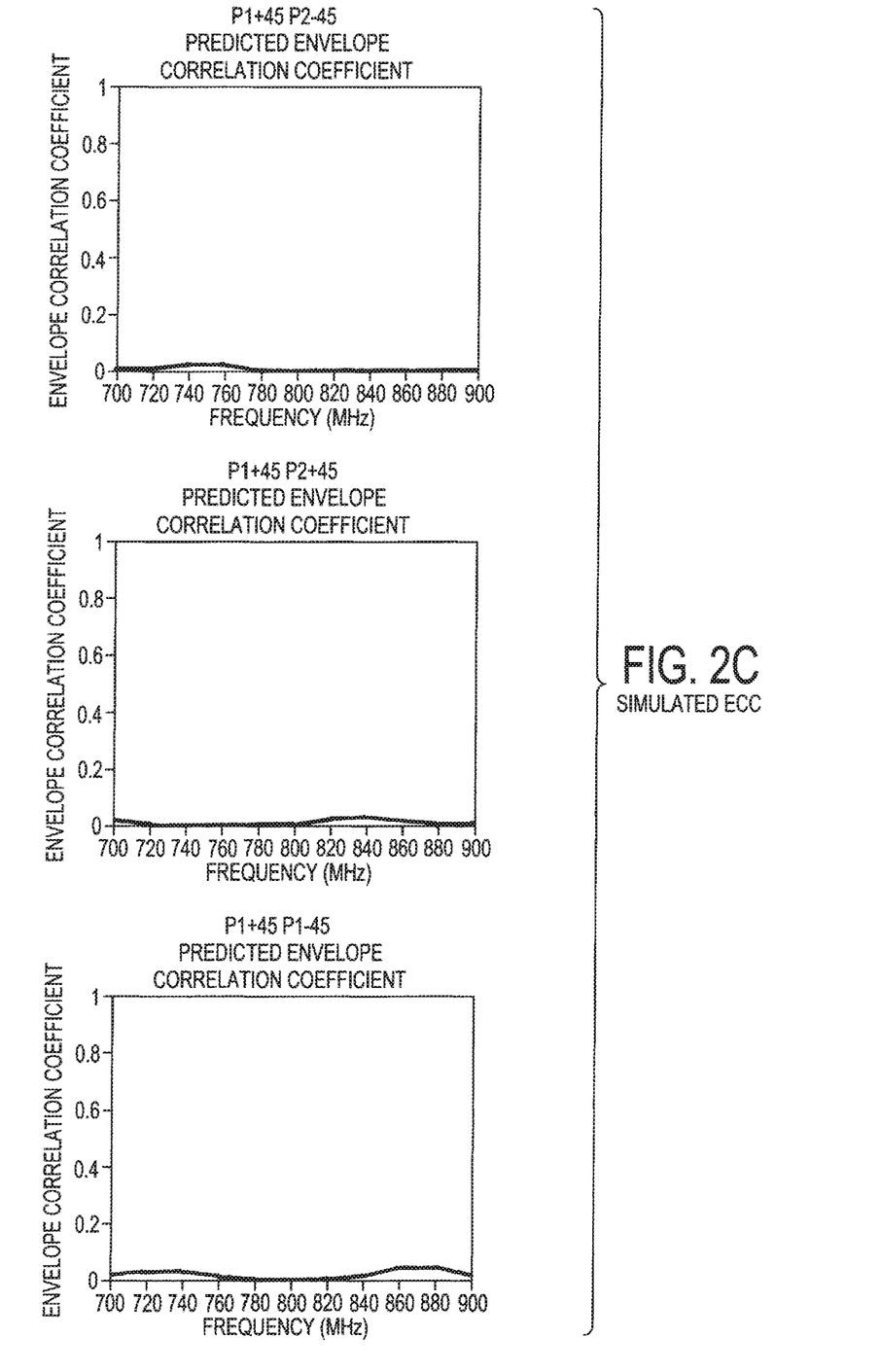
FIG. 2C is simulated ECC of the four ports of the QPRE Element operating over the 698-960 MHz frequency range.

FIG. 2A-2C shows performance over the 698-960 MHz frequency range (Low Band) but can be applied to any wireless band of operation. FIG. 2A shows the VSWR of the QPRE below 1.5:1 from 698-960 MHz and isolation (coupling) between the QPRE ports greater the 20 dB. FIG. 2B shows the normalized simulated azimuth patterns for the QPRE array, 200 is co-polarized and 210 is cross-polarized signals and elevation patterns for a 4 QPRE array with 220 is co-polarized and 230 is cross-polarized signals. FIG. 2C shows the ECC between QPRE ports below <0.1 over the frequency of operation for Low Band for simulated and measured performance with a high degree of correlation between the two sets of data.

Figure 4A:
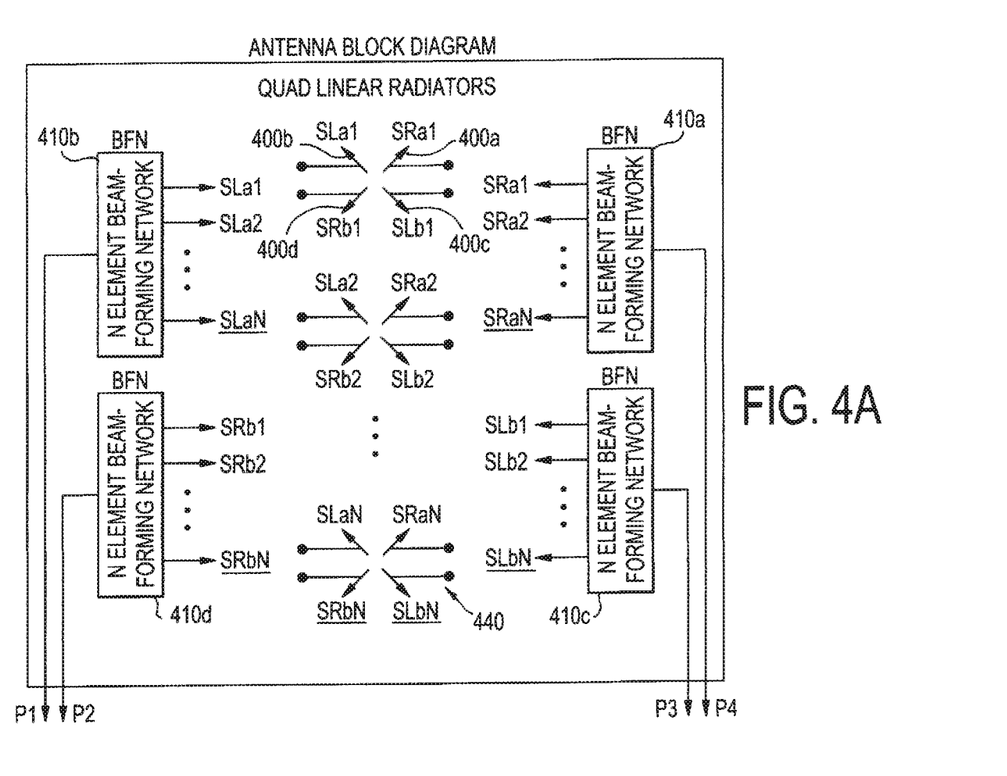
FIG. 4A is a block diagram illustrating the primary components of one embodiment of the present invention.

FIG. 4A is a block diagram for a single band QPRE antenna array that combines the QPRE elements (including the sleeve monopoles 400a . . . 400d) in the size of existing antenna arrays that only provide 2×2 MIMO capabilities. The BFN 410a . . . 410d provide the desired elevation pattern control. The resulting antenna provides four independent polarization states to achieve the required 4×4 MIMO input/output ports P1 . . . P4 capabilities in the same form factor as the 2×2 antenna of FIG. 3.

As illustrated, the antenna is a 4×4 MIMO since it has four transmitting and receiving ports P1-P4. The first port P1 is connected to a second BFN 410b, which in turn is connected to each of the upper slant left elements for the first through N antennas, $SL_{a1}, SL_{a2} \ldots SL_{aN}$; the second port P2 is connected to a fourth BFN 410d, which in turn is connected to each of the lower slant right elements for the first through N antennas, $SR_{b1}, SR_{b2} \ldots SR_{bN}$; the third port P3 is connected to a third BFN 410c, which in turn is connected to each of the lower slant left elements for the first through N antennas. $SL_{b1}, SL_{b2} \ldots SL_{bN}$; and the fourth port P4 is connected to a first BFN 410a, which in turn is connected to each of the upper slant right elements for the first through N antennas, $SR_{a1}, SR_{a2} \ldots SR_{aN}$. Through this embodiment of the present invention, doubling the orders of MIMO will provide greater site capacity using the four ports to transmit and receive wireless signals in the coverage area. The BFNs are connected directly to the cables 440, which in turn are connected to the sleeve monopoles 400, such as in FIG. 1 above.

Figure 4B:
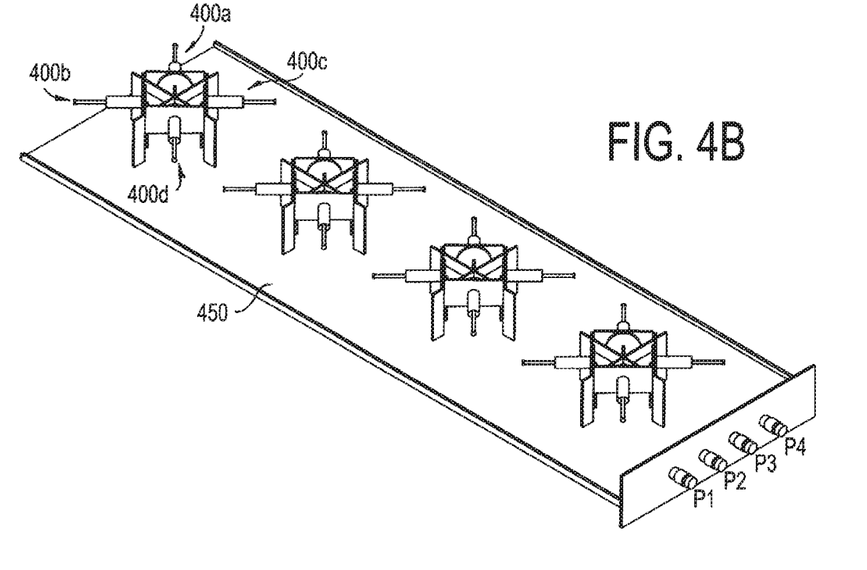
FIG. 4B is an isometric illustration of the radiating element of one embodiment of the present invention. Configured to provide 4 independent polarization for a single frequency range.

The antenna can be implemented as a planar or linear array of radiating QPRE elements. The embodiment shown is that of a linear array aligned along the vertical plane as viewed normal to the antenna site. As illustrated in FIG. 4B, the sleeve monopoles are at angles to the sides of the antenna, e.g., at about 45, 135, 225 and 315 degrees, though other suitable angles can be utilized. In the embodiment shown, the linear array factor predominantly forms the elevation beam shaping and the azimuth beam shaping is predominately formed through the QPRE element and the ground plane geometry.

Figure 6A:
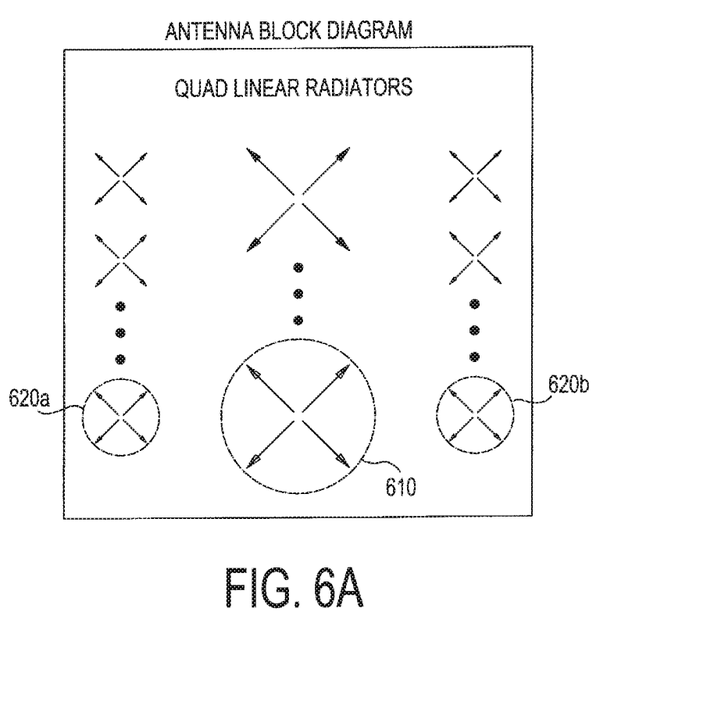
FIG. 6A is a block diagram of the QPRE radiating elements of one embodiment of the present invention used to double the number of available ports from 6 to 12 for wireless communication.
Figure 6B:
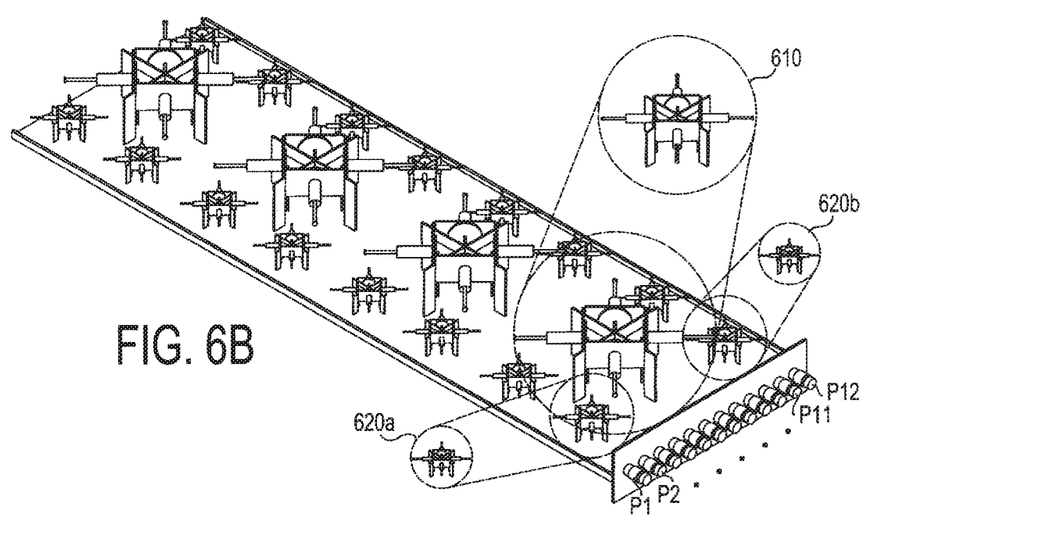
FIG. 6B is an isometric illustration of the QPRE arrays to realize the block diagram of FIG. 6A.
Figure 6C:
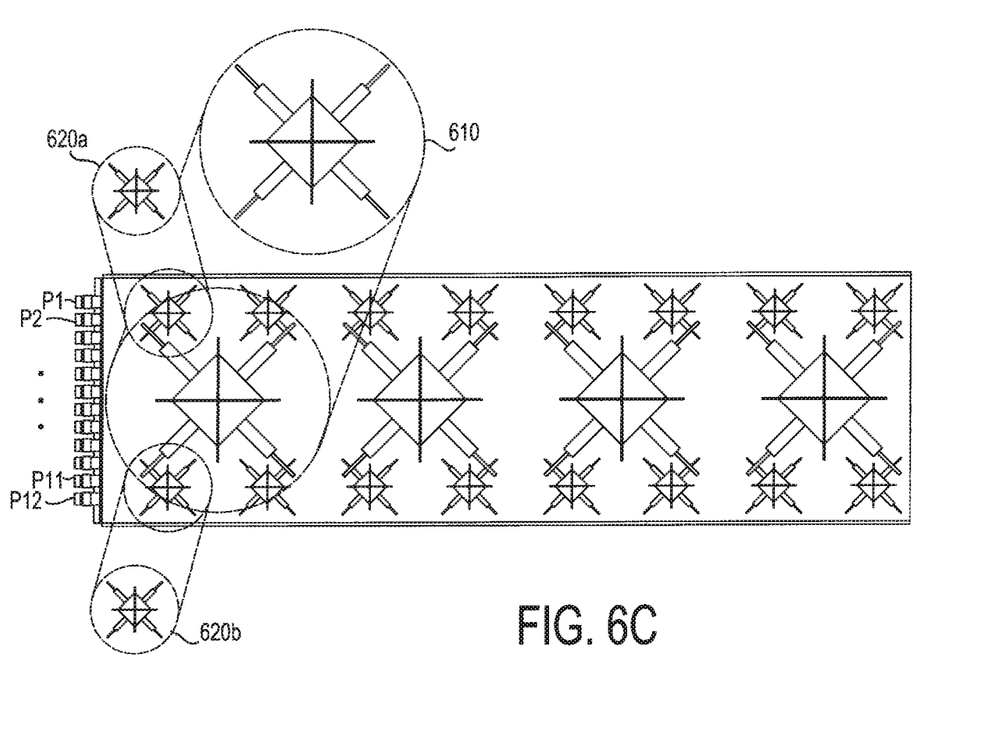
FIG. 6C is a top view illustration of the QPRE array of FIG. 6B.

An alternate embodiment of the present invention is shown in FIGS. 6A-6C. Here, a multi-band QPRE antenna, generally referred to in the industry as Tri-Band antennas, is an array that combines the QPRE element in the size of existing antenna arrays and only provides 2×2 MIMO capabilities for Low Band with existing 4×4 MIMO Operation in the PCS/AWS or like higher frequency bands (High Band). The resulting antenna provides 4×4 MIMO for Low Band, and 8×8 MIMO High Band.

The antenna can be implemented as a planar or linear arrays of radiating QPRE elements, first QPRE 610 array of elements that operates over the Low Band frequency range and a second laterally disposed another QPRE 620a array of elements that operates over the High Band frequency range and a third laterally disposed another QPRE 620b array of elements that operates over the High Band frequency range. The embodiment shown is that of linear arrays aligned along the vertical plane as viewed normal to the antenna site. In the embodiment the linear array factor predominantly forms the elevation beam shaping and the azimuth beam shaping is predominately formed through the QPRE element and the ground plane geometry.

Thus, the first high band QPREs 620a are aligned in a first column, the low band QPREs 610 are aligned in a second column, and the second high band QPREs 620b are aligned in a third column, with the second column positioned between the first and third columns. There can be twice as many high band QPREs 620a, b as low band QPREs 610. The low band QPREs 610 are substantially larger than the high band QPREs 620a, b, and can be about twice as large. Of course, other suitable arrangements and numbers of QPREs can be provided, such as for example the high and low band QPREs can be alternated in the same column, and there need not be twice as many high band QPREs and the QPREs can be of different relative sizes. The antenna of FIG. 6B has the same physical dimensions of antenna of FIG. 5 so it can replace the existing antenna (FIG. 5) without additional changes to loading factors on the tower, increased leasing cost to the operator but will double the capacity of wireless service.

Figure 7:
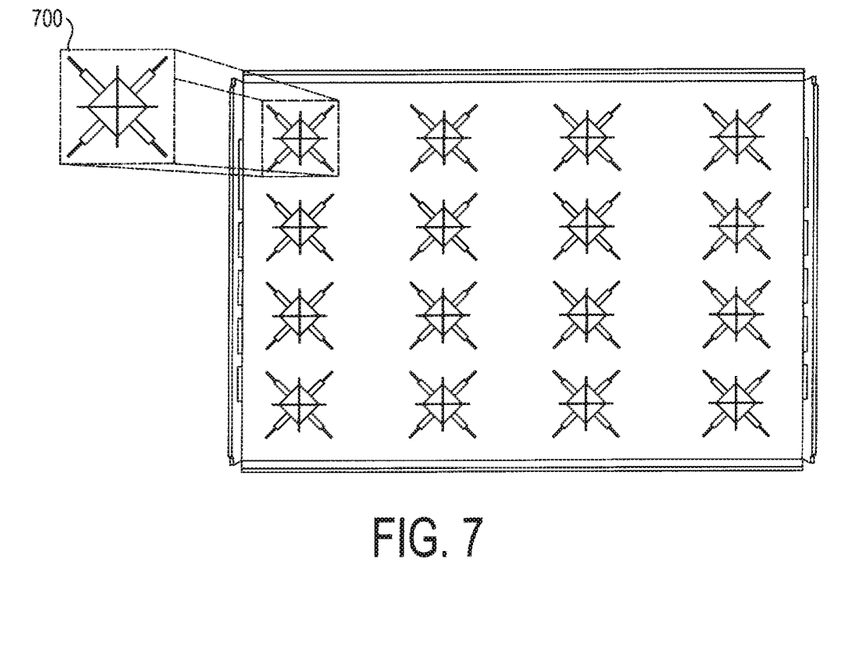
FIG. 7 is an illustration of the QPRE configured in a 4×4 massive MIMO configuration.

Another embodiment of the present invention, in FIG. 7, is a massive MIMO (mMIMO) doubling the number of ports for a given size of aperture. The antenna shown in the FIG. 7, is that of a High Band 4×4 Massive MIMO antenna using QPRE elements 700 that provide 64 ports for massive MIMO applications. The antenna size is the same as a standard 32 port 4×4 Massive MIMO antenna.

In another embodiment shown in FIGS. 8-9, a filtered main radiator 802 may be used to suppress interference signals. Referring initially to FIG. 8, the filtered main radiator 802a in this embodiment has an overall height of 112 mm. In this case, the filtering is accomplished in a similar manner to that described in U.S. patent application Ser. No. 15/395,170, (Publ. No. 2018/0138597), the entire contents of which are hereby incorporated by reference, where three PCBs filters are used to achieve filtering from 1.695-2.690 GHz in this invention. Thus, the antenna includes a sleeve 810, RF feed 820, disk 821, ring 822, through-hole 823, and cable 840. The RF feed 820 is a PCB with laminates that have copper sheets (0.0007" thickness) adhered on both sides, through an etching process the 'sheet' of copper is converted into the shapes of the flat ring 822 and the flat disk 821.

The filter elements used in the present embodiment are shown in FIG. 9. The filter elements are made of PCB material with a filter dielectric 910 having traces. The dielectric 910 is a flat planar member having a front surface and a back surface and is elongated having a length and a width. On the front surface of the dielectric 910 are formed front vertical copper traces 900a, 900b and a front horizontal copper trace 901. The vertical traces 900a, 900b are formed along the two peripheral sides of the length of the dielectric, shown on the left and right in the embodiment of FIGS. 9A, 9B. Thus, the vertical traces 900a, 900b extend linearly from the top end (nearly to the very top) of the dielectric 910 to the bottom end (nearly to the very bottom) of the dielectric 910. The front horizontal trace 901 extends transversely across the dielectric 910 from the left trace 900a to the right trace 900b. The horizontal trace 901 connects the left and right vertical traces 900a, 900b. The horizontal trace 901 can contain a U-shaped bend with orthogonal corners, as shown in FIGS. 9A, 9B. The horizontal trace 901 forms an inductive component for the filter circuit in FIG. 9A, 9B.

On the rear surface of the dielectric 910 are formed back vertical copper traces 903a, 903b. The vertical traces 903a, 903b are formed along the two peripheral sides of the length of the dielectric, shown on the left and right in the embodiment of FIGS. 9C, 9D. Thus, the vertical traces 903a, 903b extend linearly from the top end (nearly to the very top) of the dielectric 910 to the bottom end (nearly to the very bottom) of the dielectric 910.

In addition, plated through-holes 902 are provided along the front and back vertical traces 900, 903. The through-holes 902 extend through the dielectric 910 from the front surface where it connects with the front traces 900, to the rear surface where it connects with the rear traces 903. The through-holes 902 are plated to be conductive and provide a direct electrical connection between the front and back copper traces 900, 903. The plated through-holes reduce surface currents that reduce the filter performance.

The filter dielectric 910 has a thickness of 0.762 mm and the same dielectric properties as all other PCBs described previously. The copper traces 900a, 900b, 901, 903a, 903b can be 0.06 mm thick. The front vertical copper traces 900a, 903b and the back vertical copper traces 903a, 903b can have a height of 45.8 mm and a width of 1.27 mm. The horizontal copper trace can have a width of 2.9 mm and an overall length of approximately 9.8 mm. The overall height and width of the filter dielectric is 46.5 mm and 13 mm, respectively.

For purposes of illustrating the filter, FIG. 8A, 8B shows the antenna with the sleeve 810 cross-sectional views. The only differences between the filtered antenna (FIG. 8) and the antenna without filtering (FIG. 1) is the addition of the filter support 830 and filters. Thus, the common elements of FIG. 8A, 8B are the same as those of FIG. 1 as discussed with respect to FIG. 1.

Figure 10A:
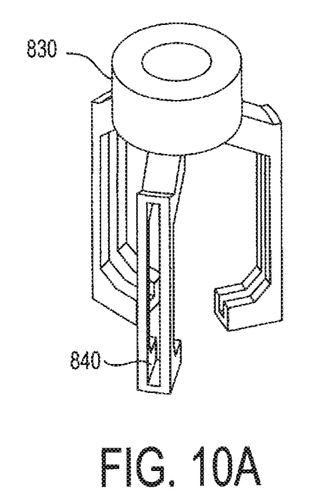
FIG. 10A-10B are illustrations of the filter support structure.
Figure 10B:
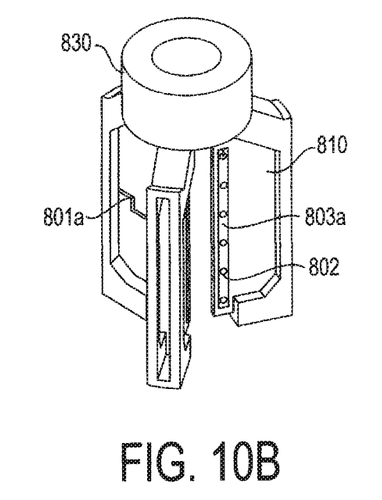

Referring to FIG. 10A, 10B, the filter support 830 is used to support the placement of the filter elements, and the top portion of the filter support is used to help impedance match the antenna in an approach similar to that described in US Publ. No. 2018/0261923. The top portion of the filter support 830 has a height of 12 mm and an outer diameter of 21 mm.

The filter support 840 is best shown in FIGS. 10A, 10B. The filter support 840 has a top portion and a bottom portion. The top portion is a tube with an inner diameter that is larger than the outer diameter of the top portion of the radiator 802. The top portion of the filter support 830 has a central opening that receives the radiator 802 and forms a friction fit. As shown, the top portion of the filter support 840 can be at the middle section of the radiator 300. The bottom portion of the filter support 840 has one or more legs that extend downward from the bottom end of the upper portion tube. The legs have a top end, an intermediate portion, and a bottom end. The top end forms a bend that extends transversely outward from the top portion of the filter support 840. The bottom end has a channel and the intermediate section has a slot 840. The channel and slot 840 together receive the filter dielectric 910 and form a friction fit to hold the filter dielectric 910 in a vertical position with one longitudinal side of each dielectric 910 extending inward toward the center to be adjacent the bottom portion of the radiator 802, such that the dielectrics 910 extend outward from the radiator 802 to the legs, as shown in FIG. 8B.

Figure 11:
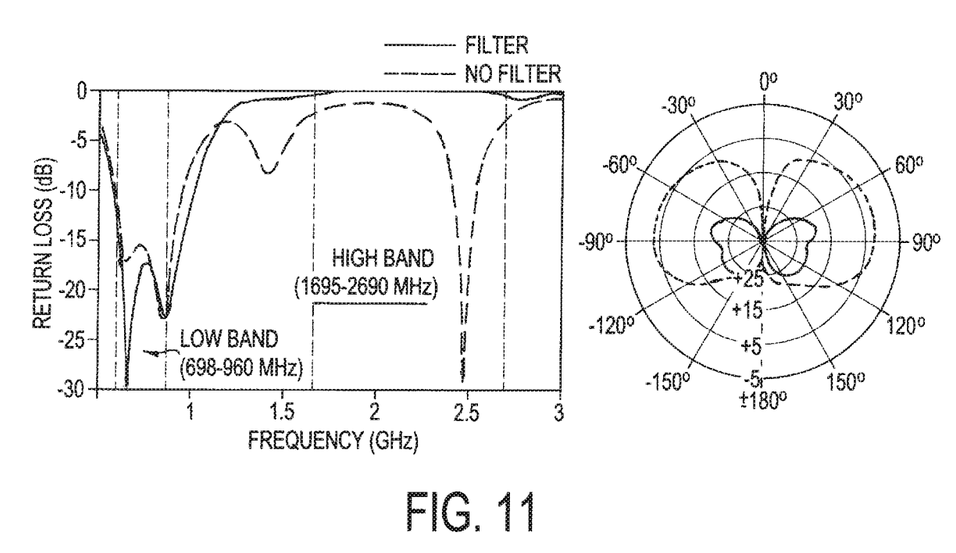
FIG. 11 is a simulated VSWR and Azimuth Pattern of the element in FIG. 8A-8D.

Referring to FIG. 11, the benefits of the filter element on VSWR and Radiating patterns is shown by the reduction in out-of-band rejection in the non-operating frequency range.

It is noted that the description and claims use several geometric or relational terms, such as circular, parallel, perpendicular, concentric, planar, square, rectangular, linear, disk, and flat. In addition, the description and claims use several directional or positioning terms and the like, such as top, bottom, upper, lower, left, right, inward facing, and outward facing. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

Within this specification, the various sizes, shapes and dimensions are approximate and exemplary to illustrate the scope of the invention and are not limiting. The sizes and the terms "substantially" and "about" mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention may be configured in a variety of shapes and sizes and is not intended to be limited by the embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. An antenna comprising:
    an elongated isolation grid formed by two intersecting isolation members each having two legs and a cross-member connecting the two legs;
    four feeds plates extending between the two intersecting isolation members, each feed plate having a feed plate through-hole, an inwardly facing side having an inwardly facing surface and an outwardly facing side having an outwardly facing surface;
    a conductive disk at the inwardly facing side of each of said four feed plates;
    a conductor at the inwardly facing side of each of said four feed plates; and
    a sleeve monopole coupled at the outwardly facing side of each of said four feed plates and extending outwardly from the outwardly facing surface, each sleeve monopole having a main radiator coupled to said conductor and a sleeve coupled to said conductive disk, said sleeve surrounding at least a portion of the main radiator.

2. The antenna of claim 1, further comprising a filter positioned between the main radiator and the sleeve.

3. The antenna of claim 1, further comprising a first antenna and a second antenna and four input/output ports, a first input/output port connected to a first radiating element of said isolation grid for said first antenna and said second antenna, a second input/output port connected to a second radiating element of said isolation grid for said first antenna and said second antenna, a third input/output port connected to a third radiating element of said isolation grid for said first antenna and said second antenna, and a fourth input/output port connected to a fourth radiating element of said isolation grid fir said first antenna and said second antenna.

4. The antenna of claim 3, wherein the first and second radiating elements are linearly arranged, and said third and fourth radiating elements are linearly arranged, and said first and second radiating elements are orthogonal to said third and fourth radiating elements.

5. The antenna of claim 1, further comprising a flat conductive ring positioned about the feed plate through-hole at the outwardly facing surface and coupled to said disk through said feed plate through-hole, wherein said sleeve is coupled to said flat conductive ring.

6. The antenna of claim 1, further comprising a disk load at a distal end of said main radiator.

7. The antenna of claim 1, said feed plate having an opening, said conductor passing through said opening to connect with said main radiator.

* * * * *